Jan. 31, 1950     J. B. WHITTED     2,496,187
ELECTRIC CONTROL MECHANISM

Filed Aug. 20, 1943     5 Sheets-Sheet 1

Inventor:
John B. Whitted
By Williams, Bradbury & Hinkle
Attorneys.

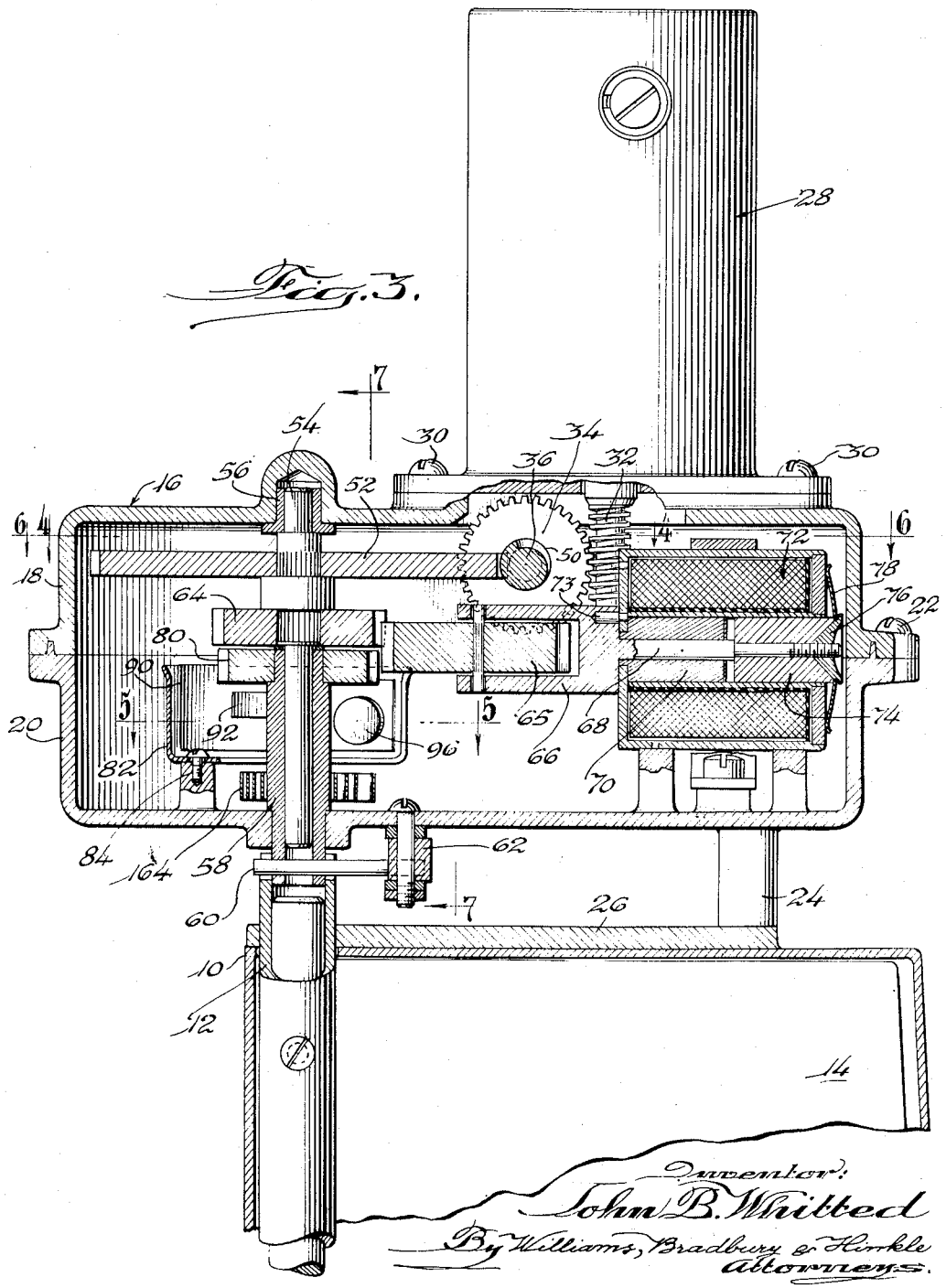

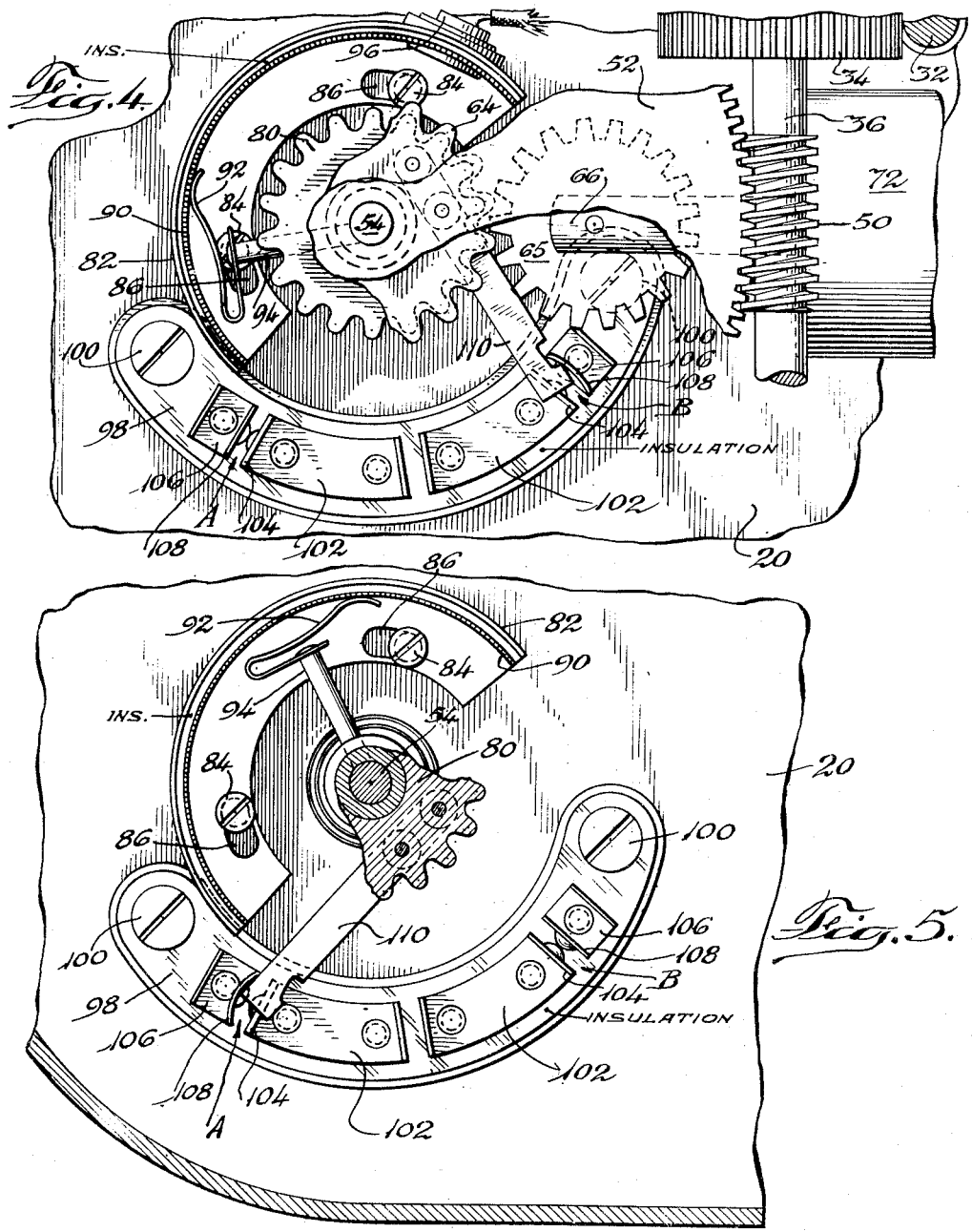

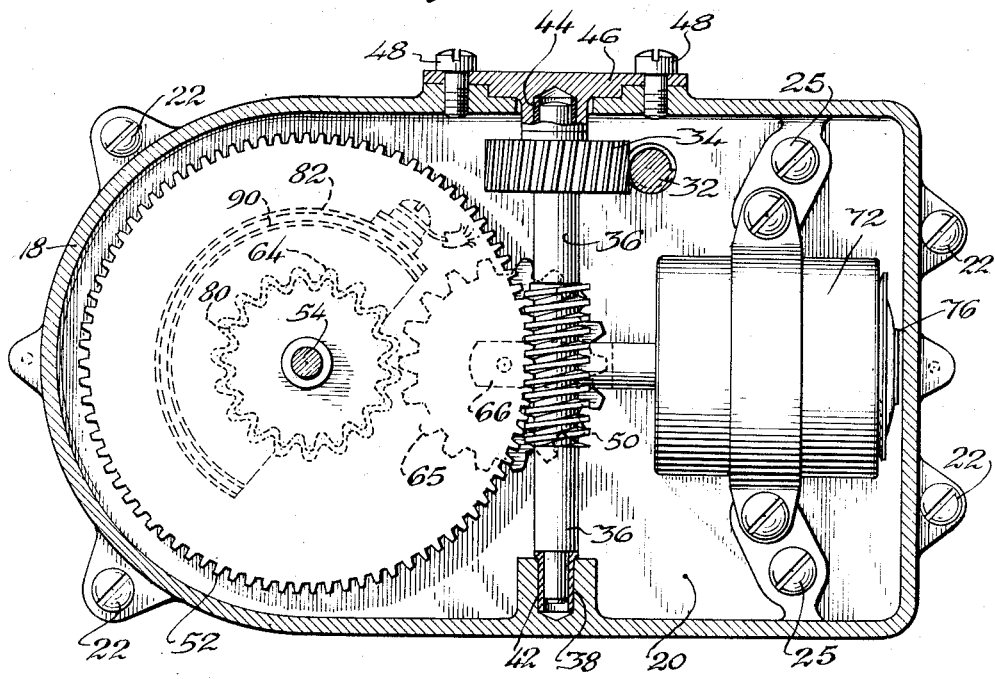

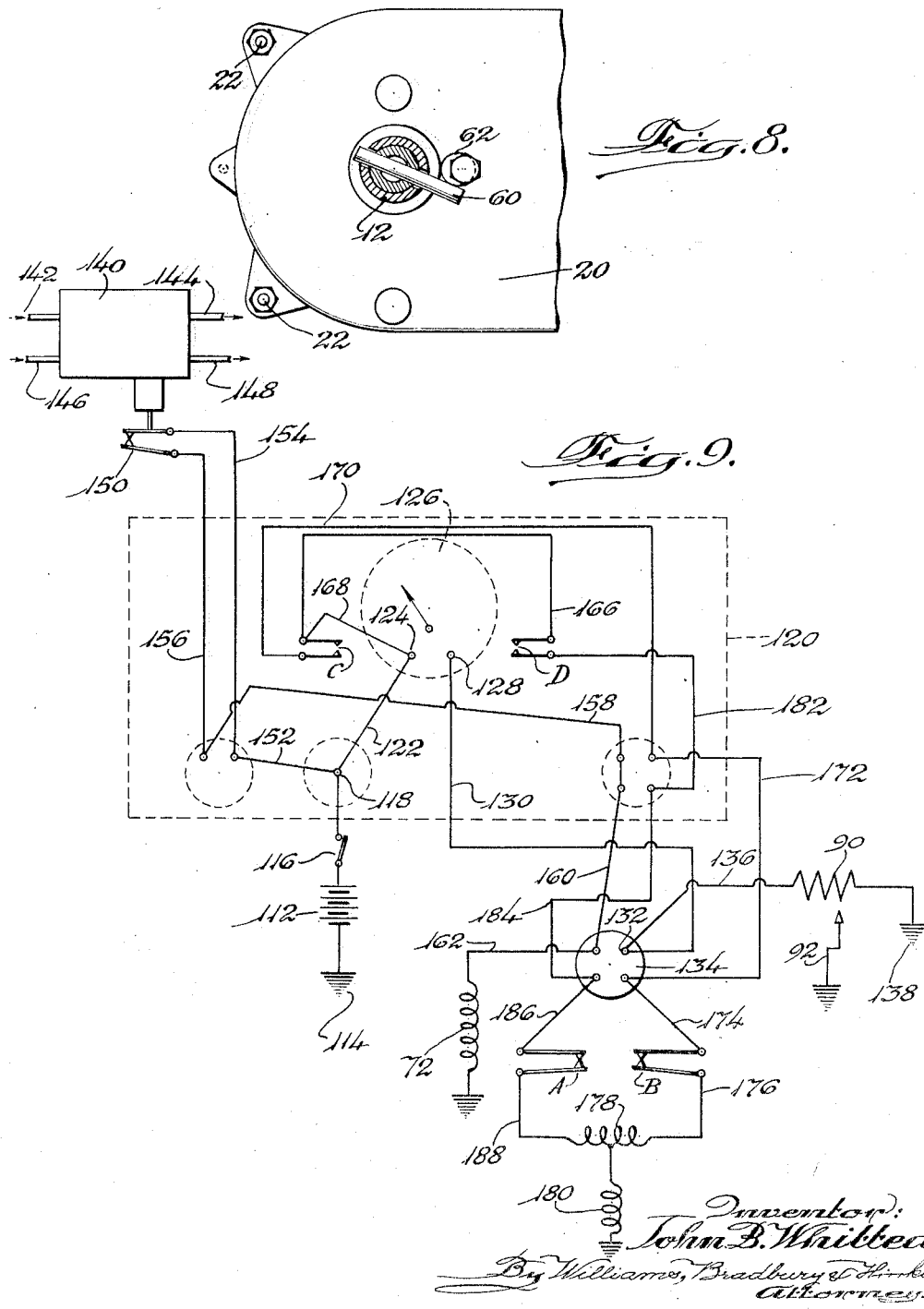

Patented Jan. 31, 1950

2,496,187

UNITED STATES PATENT OFFICE 2,496,187

ELECTRIC CONTROL MECHANISM

John B. Whitted, Evanston, Ill., assignor to Stewart-Warner Corporation, Chicago, Ill., a corporation of Virginia Application August 20, 1943, Serial No. 499,336

16 Claims. (Cl. 137—139)

My invention relates to electric control mechanism, and is illustrated and described herein as being applied to a particular valve for controlling the flow of ventilating air to the cabin of an aircraft. My invention, however, is not limited to such use and may be utilized generally as a remote control for operating any other type of valve or other structure.

An object of my invention is to provide a new and improved electric control mechanism of universal application.

Another object of my invention is to provide a new and improved electric control mechanism which may be manually operated to provide any desired positioning of the mechanism regulated by the control and which may also be automatically operated to place such mechanism in a predetermined emergency position.

Another object of my invention is to provide a new and improved electric control mechanism which may be inexpensively manufactured by conventional methods and with conventional machinery and equipment.

Another object of my invention is to provide new and improved electric control mechanism which is compact, light weight, and may be easily applied to existing machinery or equipment.

Other objects and advantages will become apparent as the description proceeds.

In the drawings,

Fig. 3 is a sectional view taken on the line 3—3 of Fig. 1;

Fig. 4 is a partial, sectional view taken generally on the line 4—4 of Fig. 3, but with parts broken away to show the structure therebeneath;

Fig. 5 is a partial, sectional view taken on the line 5—5 of Fig. 3;

Fig. 6 is a sectional view taken on the line 6—6 of Fig. 3;

Fig. 7 is a partial, irregular section taken on the line 7—7 of Fig. 3;

Fig. 8 is a partial, sectional view taken on the line 8—8 of Fig. 7; and

Fig. 9 is a wiring diagram.

Figure 1:
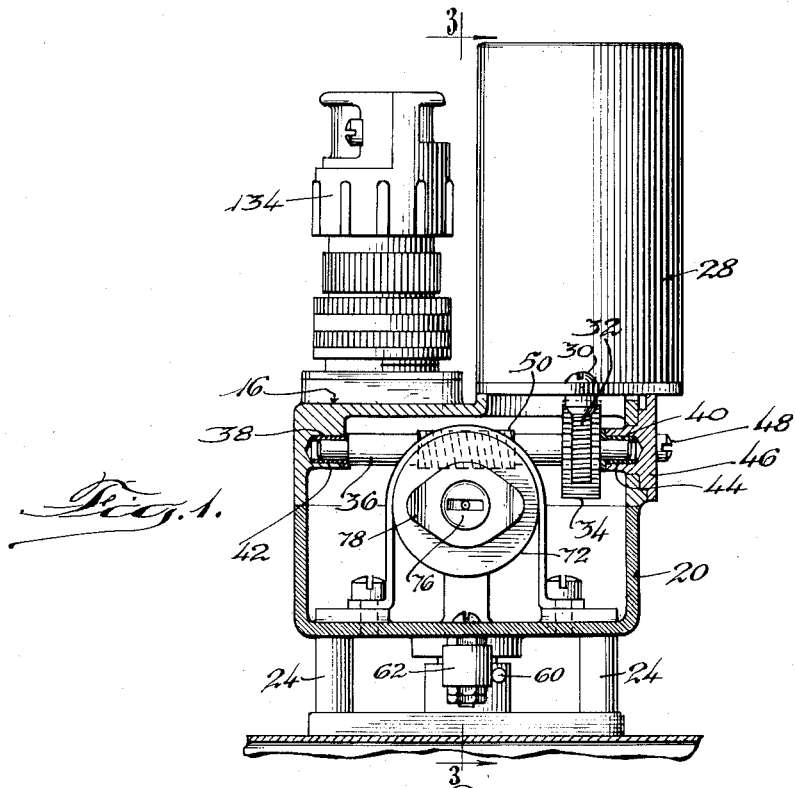
Fig. 1 is an elevational view partly in section showing a preferred form of my invention applied to a valve.
Figure 2:
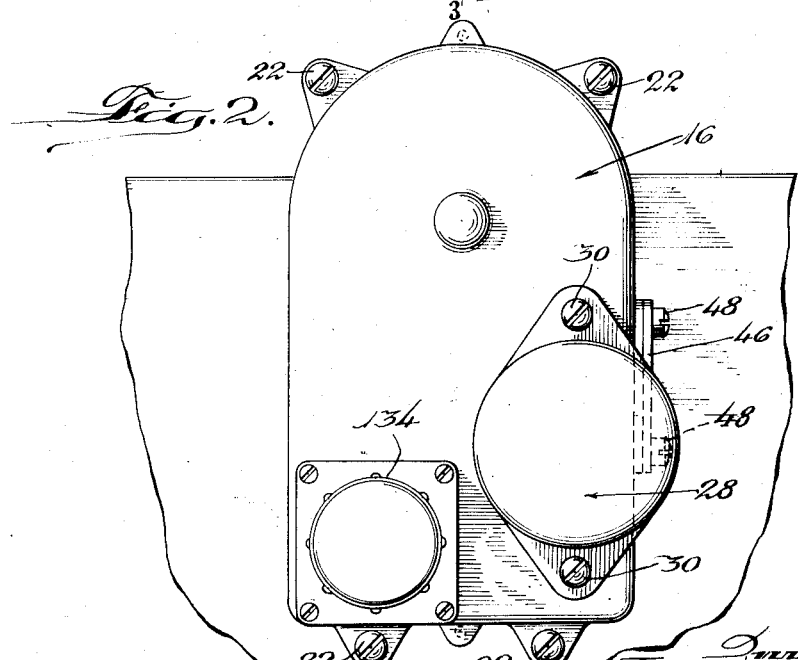
Fig. 2 is a top plan view of the mechanism shown in Fig. 1.

In the drawings, I have illustrated my electric control mechanism as being applied to a valve which is schematically shown as having a body 10 rotatably supporting a shaft 12 carrying a movable vane 14 adapted to be shifted to different positions to regulate flow of ventilating air or other fluid through the valve body and ducts connected therewith. This valve may be the four-way valve disclosed and claimed in my copending application, Serial No. 496,353, filed July 27, 1943, now Patent No. 2,388,890 of November 13, 1945, and is herein referred to as controlling the flow of ventilating air to the cabin or other enclosed space of an aircraft.

In aircraft practice it is common to heat the ventilating air by means of an internal combustion type of heater, and under certain circumstances this heater may discharge carbon monoxide or other toxic gases into the ventilating air. My novel control is herein described as reacting to the presence of such toxic gases automatically to shift the movable vane to position to prevent such gases from entering the aircraft cabin. While such an application of my invention is one for which my invention is particularly adapted, it is to be understood that this application is selected for purposes of illustration only and that my electric control mechanism is equally applicable to control other types of valves used for the same or other purposes, or for shifting the position of any movable element of a machine or other piece of apparatus or equipment.

My novel control mechanism comprises a two part housing 16 formed of a cover 18 and a base 20 secured together by screws 22 or in any other suitable manner. The base 20 is attached to supporting bosses 24 by screws 25 (Fig. 6), or in any other convenient manner. The bosses 24 may be integral with the valve body 10, but in the particular embodiment shown are illustrated as being integral parts of a plate 26 brazed or otherwise secured to this valve body.

A reversible electric motor, indicated generally by reference character 28, is mounted on the housing 16 and has a casing which is secured to the cover 18 by screws 30. This motor drives a worm 32, which in turn rotates a worm wheel 34 mounted on a shaft 36 journaled in bearings 38 and 40. The bearing 38 comprises a bushing 42 press fitted directly into a bore formed in the housing 16, whereas the bearing 40 comprises a bushing 44 supported in a plate 46 attached to this housing by screws 48 (Fig. 6). The shaft 36 has a second worm 50 which drives a second worm wheel 52 mounted on a vertical shaft 54, having its upper end journaled in a bushing 56, mounted in the cover 18.

The lower end of this shaft is journaled in a driving sleeve 58 which passes through an opening in the base 20 and projects into the end of the valve shaft 12. A pin 60 carried by the operating shaft 58 lies in suitable notches formed in the upper end of the valve shaft and forms a driving connection between these shafts. This pin is also adapted to engage an eccentric stop 62 which may be pre-set so that the vane 14 is in closed position when the pin 60 engages this stop. In other words, the position of this stop corresponds to the zero position of the valve vane referred to in my said copending application.

A gear 64 is fixed to the vertical shaft 54 and drives a gear 65 mounted in a yoke 66 having a stem 68 slidably mounted in a fixed pole piece 70 of a solenoid 72. A pin 73 carried by one end of the solenoid and projecting into a suitable bore in the yoke 66 prevents rotation of this yoke about the axis of the stem 68. Armature 74 is clamped between a shoulder of the stem 68 and a cap 76 threadedly secured to the righthand end of this stem. A leaf spring 78 is confined between the cap 76 and the adjacent end of the solenoid 72 and holds the parts in the position shown in Fig. 3, except when the solenoid 72 is energized.

The tubular operating shaft 58 has a gear 80 affixed to its upper end for driving this shaft. This gear 80 is of slightly smaller diameter than the gear 64, as clearly shown in Fig. 3. When the gear 65 and yoke 66 are in the position shown in this figure, gear 65 meshes with and is driven by gear 64 but does not engage the teeth of gear 80. When, however, the solenoid 72 is energized, armature 74 is drawn into engagement with pole piece 70, and yoke 66 and gear 65 are moved to the left sufficiently to engage the teeth of gears 65 and 80, whereupon gear 65 forms a driving connection between gears 64 and 80.

An arcuate support 82 of L-shaped cross-section is secured to the base 20 by screws 84 which pass through slots 86, whereby this support may be adjusted about the axis of the shaft 58. This support carries an arcuate electrical resistance 90 which is insulated from the support in any suitable manner. This resistance is engaged by a slider 92 carried by a pin 94 mounted in and electrically grounded through the operating shaft 58. One end of the resistance is connected to an electrical terminal 96.

An arcuate strip 98 of insulating material is attached to the base 20 by screws 100 and carries a pair of limit switches indicated generally by reference characters A and B. Each limit switch comprises a metal switch member 102 having a rigid upstanding arm 104 carrying a fixed contact and a second switch member 106 having a resilient upstanding arm 108 carrying a movable contact which is normally in engagement with the fixed contact. The resilient arms project upwardly above the rigid arms and are adapted to be engaged by a bar 110 attached to gear 80. In the embodiment shown, the gear 80 is of nonconducting material so that no insulation is needed between the switch operating bar 110 and this gear, but where the gear is made of metal, insulation must be provided so that the bar 110 is not grounded through the gear.

In Fig. 9 I have indicated a preferred arrangement of electrical connections for my novel control mechanism. In this figure I have illustrated a battery or other suitable source of electrical energy 112 as having one terminal grounded at 114 and the other terminal connected to a master switch 116. This master switch is connected to an electrical terminal 118 which, with the other mechanism enclosed in the dash line 120, is mounted on the instrument panel of the aircraft. A wire 122 connects the terminal 118 with the terminal 124 of an indicator 126 having a pointer, which may move over any suitable scale and which assumes a position accurately indicating and corresponding to the position of the vane 14 or other movable element operated by my control mechanism.

The other terminal 128 of the indicator 126 is connected by wire 130 to the terminal 132 of a terminal fitting 134 attached to the housing 16. An electrical conductor 136 connects the terminal 132 with one end of the resistance 90, the other end of this resistance being grounded as indicated at 138. The slider 92 variably engages the resistance 90 to short out more or less of this resistance and thereby vary the position of the indicator pointer to correspond to the position of the valve vane since the slider 92 is attached to and moves with the vane operating shaft 58.

In the particular embodiment shown I have provided emergency means for moving the valve vane to fully closed position if any carbon monoxide is present in the ventilating air supplied to the aircraft cabin. This means comprises a carbon monoxide detector 140 of the comparator type having a fresh air inlet pipe 142 and a fresh air outlet pipe 144. This detector also has a ventilating air inlet pipe 146 and a ventilating air outlet pipe 148, and operates by comparing samples of fresh or atmospheric air with samples of ventilating air. If carbon monoxide is present in the ventilating air, the detector 140 functions to open a normally closed switch 150 located in a circuit comprising wires 152, 154, 156, 158, 160, and 162 serving normally to maintain the battery 112 connected to the solenoid coil 72.

In normal operation the closed switch 150 and circuit of which it forms a part supplies current to solenoid coil 72 causing this coil to hold the gear 65 in outward position where it engages cooperating gears 64 and 80 to form a driving connection therebetween. Presence of carbon monoxide in the ventilating air causes the detector 140 to open switch 150 and break this circuit. Spring 78 thereupon retracts gear 65 to the position shown in Fig. 3, and thereby disconnects gear 80 from gear 64. A spiral spring 164 (Fig. 3) having one end attached to operating shaft 58 and the other end attached to housing 16, thereupon rotates this operating shaft to move the valve vane 14 to fully closed position.

Further movement of the valve vane under the influence of spring 164 is arrested by engagement of pin 60 with stop 62. In some applications engagement of the movable element of the valve or other mechanism with an associated stationary part will of itself constitute a sufficient stop and eccentric stop 62 may be eliminated. In other instances the stop 62 may be essential, whereas in a third class of applications the presence of stop 62 may not be necessary but may be advisable as an additional protection.

It is only under very exceptional circumstances that carbon monoxide is present in the ventilating air supplied to the aircraft cabin, so that under normal operating conditions the solenoid 72 will hold gear 65 in power transmitting position and the valve vane may be shifted to any desired position by driving the motor 28 in the desired direction and to the desired extent. This is accomplished by pressing on one or the other of the normally open manual control switches C and D which are mounted on the instrument panel adjacent the indicator 126 and are readily accessible to the pilot or copilot. As clearly shown in Fig. 9, the upper or fixed contacts of these switches are connected by a wire 166, and both of these contacts are normally connected to the battery by wires 168 and 22 through master switch 116. The lower or movable contact of switch C is connected by wires 170, 172, and 174 to one terminal of limit switch B.

The other terminal of this limit switch is connected by a wire 176 to the righthand half of motor field coil 178 and through motor armature 180 to ground. When the pilot holds his finger on switch C, current is supplied to the motor 28 to drive it in one direction unless the limit switch B is open; that is, unless the valve is already at the extreme limit of its movement in this direction. If the limit switch is not in such extreme position, the motor drives valve shaft 12 to move the valve vane in the desired direction, and as this movement takes place, slider 92 is moved over resistance 98 to cause the pointer of indicator 126 to follow the movement of the valve vane. When this pointer shows that the valve vane has reached the desired position the pilot releases his finger from the switch C.

When the pilot desires to shift the valve vane in the opposite direction, he presses on the lower or movable contact of switch D to close this switch and deliver current through wires 182, 184, and 186, limit switch A, and wire 188 to the lefthand half of motor field coil 178 and through motor armature 180. This causes the motor 28 to drive the valve vane and resistance slider in the opposite direction, and may be continued until limit switch A is opened by bar 110. The limit switches A and B are so positioned that the appropriate switch is opened just before the valve vane reaches the extreme limit of its movement.

As previously pointed out, the solenoid 72 is normally energized to hold the gear 65 in driving relation with gears 64 and 80. When this solenoid is no longer energized and spring 78 moves gear 65 to the position shown in Fig. 3, this gear is still in mesh with gear 64. This means that as soon as the solenoid is again energized and motor 28 is driven in either direction, gear 65 is rotated so that it will easily slide into engagement with gear 80 and no situation can arise where the teeth of gears 65 and 80 would contact in such manner as to prevent outward movement of gear 65 into full mesh with gear 80. When gear 65 is in driving engagement with gears 64 and 80, worm 50 and worm wheel 52 prevent spring 164 from moving the valve vane to closed position when the motor 28 is at rest.

While I have shown and described in detail only a single embodiment of my invention, it is to be understood that my invention is susceptible of numerous variations and modifications and includes all modifications, variations and equivalents coming within the following claims.

I claim:

1. Electrical control mechanism of the class described, comprising an operating shaft adapted to be attached to the movable element of a valve, a motor for driving said shaft, a means including switch means for supplying current to said motor selectively to operate it in opposite directions, a clutch between said motor and shaft, a solenoid for holding said clutch in engagement, and a carbon monoxide detector controlling energization of said solenoid and thereby the connection of the motor to the shaft.

2. Electric control mechanism of the class described, comprising a two-part housing, a motor carried by said housing, a worm driven by said motor, a first shaft in said housing, a first worm wheel mounted on said first shaft, a second shaft mounted in said housing, a second worm wheel mounted on said second shaft, a second worm mounted on said first shaft for driving said second worm wheel, a gear mounted on said second shaft, a third shaft in alignment with said second shaft, a second gear mounted on said second shaft, one of said gears being of slightly smaller diameter than the other, a third gear adapted to mesh with said other gears and form a driving connection between said second and third shafts, said third gear being shiftable to engage one or both of said other gears, a solenoid for moving said third gear in one direction, and emergency control mechanism for deenergizing said solenoid.

3. Electric control mechanism of the class described, comprising a two-part housing, a motor carried by said housing, a worm driven by said motor, a first shaft in said housing, a first worm wheel mounted on said first shaft, a second shaft mounted in said housing, a second worm wheel mounted on said second shaft, a second worm mounted on said first shaft for driving said second worm wheel, a gear mounted on said second shaft, a third shaft in alignment with said second shaft, a second gear mounted on said second shaft, one of said gears being of slightly smaller diameter than the other, a third gear adapted to mesh with said other gears and form a driving connection between said second and third shafts, said third gear being shiftable to engage one or both of said other gears, a solenoid for moving said third gear in one direction, a spring for moving said third gear in opposition to said solenoid, and a second spring for rotating said third shaft in one direction when said third gear is disconnected from one of said other gears.

4. Electric control mechanism of the class described, comprising an operating shaft, a housing rotatably supporting said shaft, a motor carried by said housing, driving means connecting said motor and shaft, said driving means including a clutch, a solenoid controlling said clutch, a spring for driving said shaft when said clutch is disengaged, and switch means for operating said solenoid.

5. Electric control mechanism of the class described, comprising a housing, a first shaft having one end journaled in said housing, a motor for driving said shaft, a tubular second shaft having one end journaled in said housing, said first and second shafts being telescoped, a clutch connecting said shafts, electrical means controlling said clutch, a spiral spring surrounding said second shaft and having one end connected thereto, said spring having a second end connected to said housing and urging said second shaft in a given direction, and an eccentric stop adjustable to limit movement of said second shaft under the force of said spring.

6. Electric control mechanism of the class described, comprising an operating shaft, a motor for driving said shaft in opposite directions, means for disconnecting said shaft from said motor, a pair of switches controlling energization of said motor, an indicator for indicating the position of said operating shaft, a rheostat connected to said operating shaft and said indicator, limit switches for limiting movement of said operating shaft in opposite directions, a spring for moving said shaft in one direction, means for limiting movement of said shaft by said spring, and means movable with said operating shaft for actuating said limit switches.

7. Electrical control mechanism of the class described, comprising an operating shaft adapted to be attached to the movable element of a mechanism to be controlled, a motor for driving said shaft, means including manually operable switch means for supplying current to said motor, a clutch between said motor and shaft, means normally tending to disengage said clutch, a solenoid for holding said clutch in engagement, and a toxic gas detector controlling energization of said solenoid.

8. Electric control mechanism of the class described, comprising a housing, a motor carried by said housing, a first shaft driven by said motor, a gear mounted on said first shaft, a second shaft in alignment with said first shaft, a second gear mounted on said second shaft, one of said gears being of slightly smaller diameter than the other, a third gear adapted to mesh with said other gears and form a driving connection between said second and third shafts, said third gear being shiftable to engage one or both of said other gears, a solenoid for moving said third gear in one direction, and emergency control mechanism for deenergizing said solenoid.

9. Electric control mechanism of the class described, comprising a two-part housing, a motor carried by said housing, a worm driven by said motor, a first shaft in said housing, a first worm wheel mounted on said first shaft, a second shaft mounted in said housing, a second worm wheel mounted on said second shaft, a second worm mounted on said first shaft for driving said second worm wheel, a gear mounted on said second shaft, a third shaft in alignment with said second shaft, a second gear mounted on said second shaft, one of said gears being of slightly smaller diameter than the other, a third gear adapted to mesh with said other gears and form a driving connection between said second and third shafts, said third gear being shiftable to engage one or both of said other gears, electrical means for moving said third gear in one direction, a spring for moving said third gear in opposition to said solenoid, a second spring for rotating said third shaft in one direction when said third gear is disconnected from one of said other gears, and an emergency switch controlling said electrical means.

10. Electric control mechanism of the class described, comprising an operating shaft, a housing rotatably supporting said shaft, a motor carried by said housing, driving means connecting said motor and shaft, said driving means including a clutch, a solenoid controlling said clutch, a spring for driving said shaft when said clutch is disengaged, switch means for operating said solenoid, and indicating means responsive to movements of said shaft.

11. Electric control mechanism of the class described, comprising a housing, a first shaft having one end journaled in said housing, a motor for driving said shaft, a tubular second shaft having one end journaled in said housing, said first and second shafts being telescoped, a clutch connecting said shafts, electrical means controlling said clutch, a spiral spring surrounding said second shaft and having one end connected thereto, said spring having a second end connected to said housing and urging said second shaft in a given direction, a stop adjustable to limit movement of said second shaft under the force of said spring, and an indicator having a rheostat driven by said second shaft.

12. Electric control mechanism of the class described, comprising an operating shaft, a motor for driving said shaft in opposite directions, a pair of manual switches controlling energization of said motor, an indicator for indicating the position of said operating shaft, a rheostat connected to said operating shaft and said indicator, limit switches for limiting movement of said operating shaft in opposite directions, means movable with said operating shaft for actuating said limit switches, and an automatic switch operable to return said shaft to one limit of its movement.

13. Electrical control mechanism of the class described comprising a ventilating air valve having operating mechanism including a movable element, an operating shaft attached to the movable element of the valve, said element assuming different positions corresponding to different positions of said shaft, a reversible motor for driving said shaft, means including a pair of manual switches for operating said motor in different directions, electrical circuits connecting said switches with said motor, a clutch connecting said motor with said operating shaft, a solenoid for holding said clutch in engagement, spring means for moving said clutch out of engagement, said movable element being biased to closed position when said clutch is disengaged, an indicator for showing the position of said valve element, means connecting said indicator to said shaft, and means responsive to the presence of carbon monoxide in the ventilating air for deenergizing said solenoid.

14. Electrical control mechanism of the class described comprising a ventilating air valve having operating mechanism including a movable element, an operating shaft attached to the element, said element assuming different positions corresponding to different positions of said operating shaft, a reversible motor for driving said shaft in opposite directions, means connected to said motor and including manual means controlling the direction of rotation of said motor for operating the motor in opposite directions, an indicator for indicating the position of said valve element, means connecting said indicator to said shaft, a clutch connecting said motor and shaft, a solenoid for holding said clutch engaged, means responsive to the presence of carbon monoxide in the ventilating aid for deenergizing said solenoid, a spring for moving said shaft to close said valve when said solenoid is deenergized, and an adjustable stop for limiting movement of said operating shaft under the influence of said spring.

15. Electrical control mechanism of the class described comprising a ventilating air valve having operating mechanism including a movable element, an operating shaft attached to said element, the movable element of the ventilating air valve assuming like positions with said shaft, a reversible motor for driving said shaft, means connected to said motor and including manually operated switch means for driving said motor in different directions, a clutch connecting said motor with said operating shaft, electrical means for holding said clutch in engagement, spring means for moving said clutch out of engagement, said movable element being biased to closed position when said clutch is disengaged, an indicator for showing the position of said valve member, means connecting said indicator to said shaft, and means responsive to the presence of toxic gas in the ventilating air for deenergizing said electrical means.

16. Electrical control mechanism of the class described comprising a ventilating air valve having operating mechanism including a movable element, an operating shaft attached to the movable element of the valve, said movable element assuming positions corresponding to the positions assumed by said shaft, a reversible motor for driving said shaft in opposite directions, means connected to said motor and including manual means controlling the direction of rotation of said motor for operating the motor in opposite directions, an indicator for indicating the position of said valve member, means connecting said indicator to said shaft, a clutch connecting said motor and shaft, means for holding said clutch engaged, means responsive to the presence of an impurity in the ventilating air for rendering said last named means ineffective, a spring for moving said shaft to close said valve when said solenoid is deenergized, and a stop for limiting movement of said operating shaft under the influence of said spring.

JOHN B. WHITTED.

REFERENCES CITED

The following references are of record in the file of this patent:

UNITED STATES PATENTS

| Number | Name | Date |
|---|---|---|
| 843,814 | Hewlett | Feb. 12, 1907 |
| 923,186 | Kanmacher | June 1, 1909 |
| 1,036,981 | Earnist | Aug. 27, 1912 |
| 1,481,279 | Zippel | Jan. 22, 1924 |
| 1,709,104 | Wilhjelm | Apr. 16, 1929 |
| 1,762,467 | Bovey | June 10, 1930 |
| 1,924,377 | Pontow | Aug. 29, 1933 |
| 1,965,225 | Erter | July 3, 1934 |
| 1,994,768 | Holven | Mar. 19, 1935 |
| 2,056,663 | Foulke | Oct. 6, 1936 |
| 2,189,558 | Baxter | Feb. 6, 1940 |
| 2,231,156 | Claytor | Feb. 11, 1941 |
| 2,247,562 | Santen | July 1, 1941 |
| 2,285,414 | Collins | June 9, 1942 |
| 2,292,145 | Mercereau | Aug. 4, 1942 |
| 2,347,523 | Suksdorf | Apr. 25, 1944 |

FOREIGN PATENTS

| Number | Country | Date |
|---|---|---|
| 116,876 | Switzerland | Oct. 1, 1926 |
| 373,363 | Italy | of 1939 |